United States Patent
He et al.

(10) Patent No.: US 10,757,247 B2
(45) Date of Patent: Aug. 25, 2020

(54) SWITCHING METHOD, APPARATUS AND ELECTRONIC DEVICE THEREOF

(71) Applicant: Lenovo (Beijing) Co., Ltd., Beijing (CN)

(72) Inventors: Zhijun He, Beijing (CN); Qihua Xiao, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/437,951

(22) Filed: Jun. 11, 2019

(65) Prior Publication Data

US 2019/0379782 A1    Dec. 12, 2019

(30) Foreign Application Priority Data

Jun. 11, 2018 (CN) .......................... 2018 1 0598319

(51) Int. Cl.
| | | |
|---|---|---|
| H04M 3/42 | (2006.01) | |
| H04M 1/725 | (2006.01) | |
| H04R 1/10 | (2006.01) | |
| H04S 7/00 | (2006.01) | |

(52) U.S. Cl.
CPC ... *H04M 1/72569* (2013.01); *H04M 1/72558* (2013.01); *H04R 1/10* (2013.01); *H04S 7/302* (2013.01)

(58) Field of Classification Search
USPC .......................................... 381/58; 455/414.1
See application file for complete search history.

(56) References Cited

U.S. PATENT DOCUMENTS

| | | | | |
|---|---|---|---|---|
| 10,242,695 | B1* | 3/2019 | Velusamy | ........... G10L 21/0208 |
| 2014/0185828 | A1 | 7/2014 | Helbling | |
| 2015/0195662 | A1* | 7/2015 | Hsu | ........................ H04M 1/24 |
| | | | | 381/58 |

FOREIGN PATENT DOCUMENTS

| | | | |
|---|---|---|---|
| CN | 101345055 | A | 1/2009 |
| CN | 102625207 | A | 8/2012 |
| CN | 103581803 | A | 2/2014 |
| CN | 103946732 | A | 7/2014 |
| CN | 104244139 | A * | 12/2014 |
| CN | 104597622 | A | 5/2015 |
| CN | 104898276 | A | 9/2015 |
| CN | 105681950 | A | 6/2016 |
| CN | 105872209 | A * | 8/2016 |
| CN | 106101909 | A | 11/2016 |
| CN | 106535027 | A | 3/2017 |
| CN | 106796771 | A | 5/2017 |

(Continued)

*Primary Examiner* — David Q Nguyen
(74) *Attorney, Agent, or Firm* — Anova Law Group, PLLC (57) ABSTRACT

A switching method for an electronic device includes: acquiring first environment information at first time; acquiring second environment information at second time, the second time being later than the first time; determining whether the first environment information satisfies a first condition; and in response to the first environment information satisfying the first condition, switching the electronic device from a first operation mode to a second operation mode. In the first operation mode, the electronic device processes second environment information in a first processing manner; and in the second operation mode, the electronic device processes the second environment information in a second processing manner.

20 Claims, 5 Drawing Sheets

(56) References Cited

FOREIGN PATENT DOCUMENTS

| CN | 106999768 A | 8/2017 |
| CN | 108064447 A | 5/2018 |

* cited by examiner

SWITCHING METHOD, APPARATUS AND ELECTRONIC DEVICE THEREOF

CROSS-REFERENCE TO RELATED APPLICATION

This application claims the priority to Chinese Patent Application No. 201810598319.7, entitled "Switching method, apparatus and electronic device thereof," filed on Jun. 11, 2018, the entire content of which is incorporated herein by reference.

TECHNICAL FIELD

The present disclosure relates to a switching method, a switching apparatus, and an electronic device thereof.

BACKGROUND

With the advancement of science and technology, electronic devices with various functions appear in many settings such as work and daily life. The functional requirements of electronic devices may change according to the settings. For example, when a user uses a multimedia device that outputs contents, in certain scenarios, the user may need to be immersed in the outputted contents. In other scenarios, the user may need to sense the surrounding environment. Therefore, how to control the output of an electronic device to adapt to a variety of different scenarios has become an urgent problem to be solved.

SUMMARY

In one aspect of the present disclosure, a switching method for an electronic device is provided. The switching method includes: acquiring first environment information at first time; acquiring second environment information at second time, the second time being later than the first time; determining whether the first environment information satisfies a first condition; and in response to the first environment information satisfying the first condition, switching the electronic device from a first operation mode to a second operation mode. In the first operation mode, the electronic device processes second environment information in a first processing manner; and in the second operation mode, the electronic device processes the second environment information in a second processing manner.

In certain embodiments, the first processing manner and the second processing manner comprise two of: performing first processing on the second environment information to reduce an impact of the second environment information on a user's perception of media content outputted by the electronic device; leaving the second environment information unprocessed to retain the user's perception of the second environment information while the user perceiving the media content outputted by the electronic device; and performing second processing on the second environment information to acquire second environment content related to the second environment information, and outputting the second environment content with the media content by the electronic device.

In certain embodiments, the switching method further includes storing the first environment information. Further, performing the second processing on the second environment information includes at least one of: performing the second processing on the first environment information to acquire first environment content related to the first environment information, and outputting the first environment content before outputting the second environment content; and performing the second processing on combined environment information including the first environment information and the second environment information to acquire combined environment content related to the combined environment information, and outputting the combined environment content with the media content by the electronic device.

In certain embodiments, after being switched from the first operation mode to the second operation mode, the electronic device enhances a user's perception of the second environment information.

In certain embodiments, the first environment information and the second environment information are a same type of information.

In certain embodiments, the first environment information and the second environment information are different types of information.

In certain embodiments, determining whether the first environment information satisfies the first condition includes: identifying identity information of a person in the first environment information; and determining whether the identity information of the person matches preconfigured identity information.

In certain embodiments, determining whether the first environment information satisfies the first condition includes: identifying content information corresponding to the first environment information; and determining whether the content information matches preconfigured content.

In another aspect of the present disclosure, an electronic device is provided. The electronic device includes: a collection device configured to acquire first environment information at first time and acquire second environment information at second time, the second time being later than the first time; a processing device configured to: determine whether the first environment information satisfies a first condition; and in response to the first environment information satisfying the first condition, switch the electronic device from a first operation mode to a second operation mode; and an output device configured to output media content. In the first operation mode, the electronic device processes second environment information in a first processing manner; and in the second operation mode, the electronic device processes the second environment information in a second processing manner.

In certain embodiments of the electronic device, the first processing manner and the second processing manner comprise two of: performing first processing on the second environment information to reduce an impact of the second environment information on a user's perception of a media content outputted by the electronic device; leaving the second environment information unprocessed to retain the user's perception of the second environment information while the user perceiving the media content outputted by the electronic device; and performing second processing on the second environment information to acquire second environment content related to the second environment information, and outputting the second environment content with the media content by the electronic device.

In certain embodiments of the electronic device, the electronic device further comprises a storage device configured to store the first environment information; and performing the second processing on the second environment information includes at least one of: performing the second processing on the first environment information to acquire first environment content related to the first environment information, and outputting the first environment content before outputting the second environment content; and performing the second processing on combined environment information including the first environment information and the second environment information to acquire combined environment content related to the combined environment information, and outputting the combined environment content with the media content by the electronic device.

In certain embodiments of the electronic device, after being switched from the first operation mode to the second operation mode, the electronic device enhances a user's perception of the second environment information.

In certain embodiments of the electronic device, determining whether the first environment information satisfies the first condition includes: identifying identity information of a person in the first environment information; and determining whether the identity information of the person matches preconfigured identity information.

In certain embodiments of the electronic device, determining whether the first environment information satisfies the first condition includes: identifying content information corresponding to the first environment information; and determining whether the content information matches preconfigured content.

In certain embodiments of the electronic device, the collection device comprises at least one of an image capturing device and an audio collecting device; and the output device comprises at least one of a display device and an audio output device.

In another aspect of the present disclosure, a computer system for switching an electronic device is provided. The computer system includes: a computer-readable storage medium configured to store executable instructions; and a processor, when executing the stored executable instructions, configured to: acquire first environment information at first time; acquire second environment information at second time, the second time being later than the first time; determine whether the first environment information satisfies a first condition; and in response to the first environment information satisfying the first condition, switch the electronic device from a first operation mode to a second operation mode. In the first operation mode, the electronic device processes second environment information in a first processing manner; and in the second operation mode, the electronic device processes the second environment information in a second processing manner.

In certain embodiments of the computer system, the first processing manner and the second processing manner comprise two of: performing first processing on the second environment information to reduce an impact of the second environment information on a user's perception of a media content outputted by the electronic device; leaving the second environment information unprocessed to retain the user's perception of the second environment information while the user perceiving the media content outputted by the electronic device; and performing second processing on the second environment information to acquire second environment content related to the second environment information, and outputting the second environment content with the media content by the electronic device.

In certain embodiments of the computer system, the memory is further configured to store the first environment information; and performing the second processing on the second environment information includes one of: performing the second processing on the first environment information to acquire first environment content related to the first environment information, and outputting the first environment content before outputting the second environment content; and performing the second processing on combined environment information including the first environment information and the second environment information to acquire combined environment content related to the combined environment information, and outputting the combined environment content with the media content by the electronic device.

In certain embodiments of the computer system, the first environment information and the second environment information are a same type of information.

In certain embodiments of the computer system, the first environment information and the second environment information are different types of information.

The above aspects will be described in detail with accompanying drawings.

BRIEF DESCRIPTION OF THE DRAWINGS

In order to more clearly illustrate the technical solutions provided by the present disclosure, the drawings used in the description of the embodiments will be briefly described below.

DETAILED DESCRIPTION OF THE EMBODIMENTS

The technical solutions provided by the present disclosure according to various embodiments are described below with reference to the drawings. The described embodiments are only part of the embodiments of the present disclosure. Other embodiments acquired by a person of ordinary skill in the art based on the described embodiments without departing from the spirit of the disclosure are the within scope of the present disclosure.

The present disclosure provides a switching method. According to certain embodiments, the switching method may include: acquiring first environment information; and if the first environment information satisfies a first condition, switching the electronic device from a first mode to a second mode. In the first mode, the electronic device may process second environment information in a first manner, and in the second mode, the electronic device may process the second environment information in a second manner different from the first mode. The first environment information may be acquired at a first time point, the second environment information may be acquired at a second time point, and the second time point may be later in time than the first time point.

When a user uses a multimedia device, the multimedia device may switch between different operation modes according to environment information to adapt to different application scenarios. Thus, a user can perceive the environment information in different degrees in the various scenarios, thereby satisfying the user's different needs in different scenarios and improving the user experience.

Figure 1:
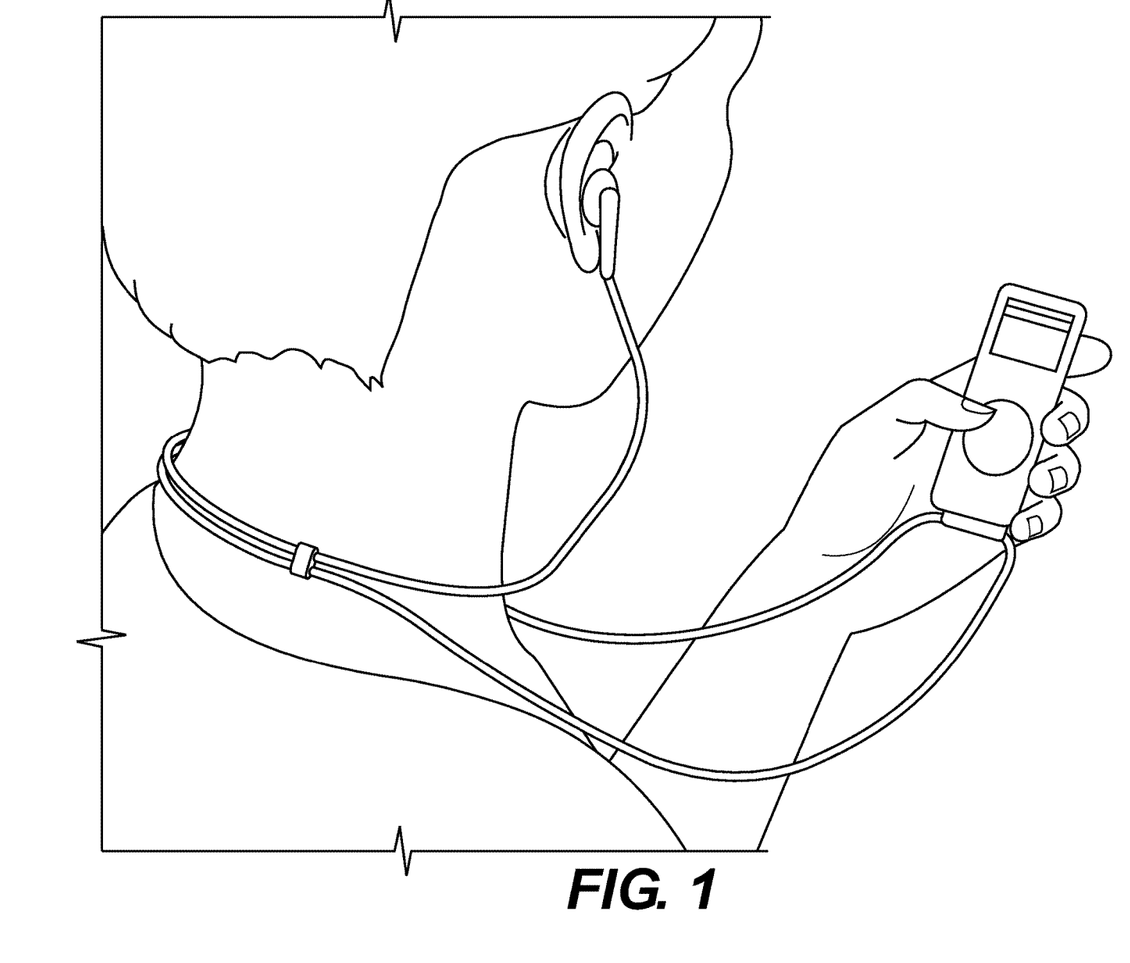
FIG. 1 illustrates an application scenario of a switching method, a switching device, and an electronic device according to certain embodiments of the present disclosure.

FIG. 1 illustrates an application scenario of the switching method, a switching apparatus, and an electronic device according to certain embodiments of the present disclosure.

As shown in FIG. 1, when a user listens to audio content using a device such as a headphone, the user may need different listening experiences in different application scenarios.

In some scenarios (e.g., while studying or working), the user may need a quiet environment to listen attentively to the audio content played by the electronic device. For example, the user may want to block ambient sound and only hear the audio content played by the electronic device.

In certain other scenarios, the user may not want to exclude ambient sound when listening to the audio content played by the electronic device. For example, the user may want to listen to the audio content played by the electronic device while still hearing sound from the surrounding environment in the background.

In certain other scenarios, a user may listen to a device such as a headphone in a noisy environment, e.g., listening to a song on a subway train. On the one hand, the user may not want to be interfered by a noisy ambient sound. On the other hand, the user may not want to miss important information from the environment, such as reporting of upcoming subway stations. That is, the user may wish to hear the played audio content while also hearing important information in the ambient sound.

In view of the above, according to certain embodiments, the electronic device may provide various output modes that cause the user to perceive the surrounding environment information differently. In certain embodiments, the electronic device may switch among multiple output modes according to conditions that the surrounding environment information satisfies. For example, it may be switched between any two of the above-described scenarios. The electronic device may switch among three output modes in the above scenarios to meet user requirements and improve the user experience.

FIG. 1 is only an example of a scenario in which certain embodiments of the present disclosure may be applied to help those skilled in the art understand the technical content of the present disclosure. For example, FIG. 1 is only an example of an auditory-sensing application scenario of certain embodiments of the present disclosure. The switching method provided by the present disclosure may also be used in various application scenarios such as visual sensing, tactile sensing, olfactory sensing, or taste sensing.

Figure 2:
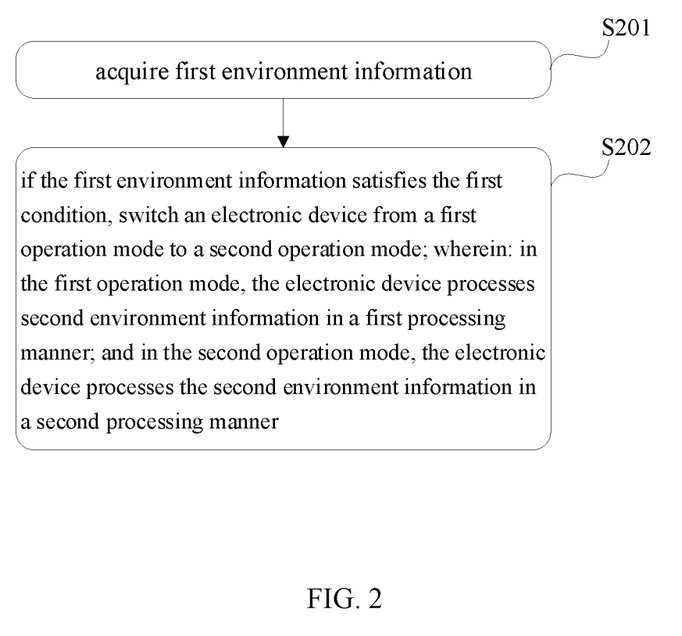
FIG. 2 is a flowchart showing a switching method according to certain embodiments of the present disclosure.

FIG. 2 is a flow chart illustrating a switching method according to certain embodiments of the present disclosure. As shown in FIG. 2, the switching method includes steps S201 and S202.

Step S201 is to acquire first environment information.

Step S202 is to switch an electronic device from a first operation mode to a second operation mode if the first environment information satisfies a first condition.

In the above steps, in the first mode, the electronic device may process second environment information in a first manner. In the second mode, the electronic device may process the second environment information in a second manner different from the first manner. Here, the first environment information is acquired at a first time point, the second environment information is acquired at a second time point, and the second time point is later than the first time point.

According to certain embodiments of the present disclosure, the switching method may include acquiring the first environment information of the surrounding environment at a first time point and determining whether the first environment information satisfies the first condition. If the first environment information satisfies the first condition, the switching method switches the electronic device from the first mode to the second mode, so that the electronic device may process the second environment information acquired after switching in the second manner, thereby changing the manner in which the electronic device processes the environment information.

According to certain embodiments of the present disclosure, the first environment information and the second environment information may be a same type of information. For example, the first environment information and the second environment information may both be audio information. When audio information in the collected environment information satisfies a certain condition, the electronic device may switch the processing manner of the audio information. Alternatively, if image information in the collected environment information satisfies a certain condition, it may trigger the electronic device to switch processing manner of the image information.

According to certain other embodiments, the first environment information and the second environment information may be different types of information. For example, the first environment information may be audio information, the second environment information may be image information, or the first environment may be image information, and the second environment may be audio information. When audio information in the collected environment information satisfies a certain condition, the electronic device may switch the processing manner of the image information. Alliteratively, if image information in the collected environment information satisfies a certain condition, the electronic device may be triggered to switch the processing manner of the audio information.

The environment information in the embodiments of the present disclosure is not limited to the image information and the audio information in the above examples. The environment information may further include taste information, olfactory information, tactile information, and the like. The first environment information and the second environment information may be same or different types of environment information, and the present disclosure is not limited therein. For example, the first environment information may be taste information, and the second environment information may be tactile information or the like.

In certain embodiments of the present disclosure, if the first environment information and the second environment information are the same type of information, the electronic device may acquire the first environment information and the second environment information by using a same collection device. For example, the environment information may be audio information collected through a microphone, or image information collected by a camera, or olfactory information collected by an odor sensing device, thereby reducing the cost of the electronic device.

In certain embodiments of the present disclosure, when the first environment information and the second environment information are different types of environment information, the electronic device may be adapted to more scenarios, improving the diversity and comprehensiveness of applications. For example, in a scenario where a user crosses a street wearing a headphone, the first environment information may be image information, and the second environment information may be audio information. When the image information indicates that the user has approached an intersection, the operation mode of the electronic device may be switched. In order to enhance the user's sensing of certain audio information (such as enhance the user's sensing of a siren), the user may be prevented from missing important audio information.

In certain embodiments of the present disclosure, when the first environment information and the second environment information are different types of environment information, the first environment information may be a first type of information, and the second environment information may include both the first type of information and a second type of information. For example, the first environment information may be video information, and the second environment information may be audio information and video information. In a virtual reality (VR) scenario, when the video information satisfies a certain condition, the switching method may switch the processing of the video and the audio.

According to certain embodiments of the present disclosure, the first type of environment information may be collected by a corresponding collection device, and the collected result may be analyzed. The switching method may further include determining an output device of a suitable type from multiple types of outputs according to the analysis result, and switching the processing manner of the determined output device.

In certain embodiments of the present disclosure, if the analysis result indicates a first priority, the output device of a type with high impact may be chosen. If the analysis result indicates that a second priority is lower than the first priority, the output device of a type with lower impact may be chosen. Among them, high impact and low impact refer to the impact of type of the devices on the user's immersion experience. For example, the impact of a visual immersion experience on the user may be greater than an audio experience, or the impact of an audio immersion experience on the user may be greater than the visual experience. The impacts are not limited by the present disclosure, and can be configured by a person skilled in the art according to the application.

In certain embodiments, when the first type of environment information is video information, the first environment information may be collected by a video camera. The collected first environment information may be analyzed, and the corresponding type of output device may be determined according to the analysis result, thereby enabling switching the processing mode of the determined output device. For example, if the analysis result indicates a higher priority (e.g., a particular person is approaching), then the video output device may be chosen to be a suitable output device, thereby switching the processing mode to the video output device. Alternatively, the video output device and the audio output device may be chosen to be suitable output devices, thus switching the processing mode to the video output device and the audio output device. If the analysis result indicates a lower priority (e.g., a particular person is merely passing by), the audio output device may be chosen to be a suitable output device, thus switching the processing mode to the audio output device.

In some embodiments of the present disclosure, the switching method may include determining if the first environment information satisfies a first condition. The first condition may be whether the first environment information includes identity information of a person in the environment and whether the identity information matches preconfigured identity information.

In certain embodiments, determining whether the first environment information includes identity information of a person in the environment and whether the identity information matches preconfigured identity information may include: identifying identity information of the person in the environment in the first environment information, where the identity information may include voiceprints and/or facial feature information, and determining whether the identity information matches preconfigured identity information.

In certain embodiments, the switching method may include acquiring the voiceprint information of a person in the first environment information, and determining whether the voiceprint information matches preconfigured identity information, for example, whether the voiceprint information of the person in the environment matches voiceprint information of a preconfigured relative, a friend. If a match is found, the environment information may be deemed as satisfying the first condition.

In certain embodiments, the switching method may include acquiring facial feature information of a person in the environment, determining whether the acquired facial feature information matches the facial feature information of a preconfigured relative, friend, or colleague, and determining the first environment information satisfies the first condition if there is a match.

In certain scenarios, the user may wish not to be affected by noisy environment while not missing sensing important people. For example, in a work setting, sometimes the user may not want to be disturbed by the conversation of the colleagues, while still hoping to perceive information from a specific person (e.g., the voice of a supervisor). In this case, it is possible to detect whether there is voiceprint information of a specific person via a microphone, or whether there is facial feature of a specific person through a camera. When a specific person is detected, the user's sensing of related information of the specific person may be enhanced, so that the user may perceive the specific person without missing important information.

According to some embodiments of the present disclosure, the first condition may be whether the first environment information includes content information corresponding to the first environment information that matches preconfigured content.

Specifically, determining whether the first environment information includes content information corresponding to the first environment information that matches the preconfigured content may include: identifying the content information corresponding to the first environment information, and determining whether the content information matches preconfigured content.

For example, the switching method may include acquiring the content information corresponding to the first environment information, and determining whether there is content information matching the preconfigured content in the acquired content information, e.g., whether there is a siren, whether there is a reporting of upcoming stations, or whether there is a name of a specific person or transaction. If there is matching content information, it indicates that the first environment information satisfies the first condition.

In certain scenarios, the user may wish not to be affected by noisy environment while not missing sensing of important people. For example, on a subway train, the user may not want to be disturbed by noisy sound in the subway but hope to perceive the reporting information of subway stations. In this case, the switching method may include determining whether the collected environment information contains contents related to reporting of stations. If there is content related to reporting of stations, the switching method may include enhancing the user's sensing of the content of station reporting, preventing the user from missing the station information. In another example, in a setting where the user is taking a walk, the user may not wish to be disturbed by the ambient sound, and may not want to miss a greeting of an acquaintance. The switching method may include determining whether the environment information contains the name of a specific person, for example, if the environment information contains the user's own name. If the environment information contains the user's own name, the switching method may include enhancing the user's sensing of the corresponding content, preventing the user from missing the content.

The audio information, image information, and the like in the above examples are merely exemplary descriptions of the environment information in order to facilitate the understanding by those skilled in the art. The present disclosure does not limit the type of information. The environment information may be one of auditory, visual, olfactory, taste, or tactile information chosen by a person skilled in the art according to the application.

Taking the olfactory information as an example, if an odor collected by the electronic device through an odor sensor satisfied a certain the condition (e.g., the environment contains the scent of a dangerous substance such as gasoline, carbon monoxide or natural gas), the operation mode of the electronic device may be switched to enhance the sensing of the odor of the environment, such as by opening an enclosure so that the electronic device cannot shield the ambient scent, or by enhancing or superimposing the ambient scent (e.g., using odor generator simulation or a fan so that more odor enters the enclosed range, etc.).

In certain embodiments of the present disclosure, the first mode and the second mode may include at least two of the following processing modes.

The first processing mode includes performing a first processing on the second environment information, so that the electronic device reduces the influence of the second environment information on the user's sensing of the media content information outputted by the electronic device.

According to certain embodiments of the present disclosure, the second environment information may be audio information. When the second environment information is audio information, the first processing of the second environment information may be to at least partially remove the ambient audio information in the second environment information (e.g., reducing noise in the audio information in the second environment information). For example, the electronic device may output a waveform negative to the audio information in the second environment information while outputting the media content information, thereby offsetting the influence of the audio information in the second environment information on the user's sensing of the media content information.

According to certain embodiments of the present disclosure, the second environment information may be video information. In a scenario where the electronic device has a transparent screen, the first processing of the second environment information (video information) may be to reduce the transmittance of the screen of the electronic device, thereby reducing the influence of the second environment information to the user's sensing of video information played on the screen.

According to certain embodiments of the present disclosure, the second environment information may also be olfactory information. In a scenario where the electronic device is a wearable electronic device (e.g., a mask), the first processing of the second environment information (olfactory information) may be to close a gas passage between the wearable electronic device and the external environment, blocking outside air from the head-mounted electronic device. For example, the wearable electronic device may work through a filtered gas channel or a self-circulating gas channel to reduce the user's olfactory sensing of the external environment.

According to certain embodiments of the present disclosure, the second environment information may also be tactile information. In a scenario where the electronic device is a wearable electronic device (e.g., a glove or a garment), the first processing of the second environment information (tactile information) may be to change the state of the electronic device, thereby changing the tactile transmission process and reducing a user's sensing of tactile event (e.g., pressure or temperature) from the external environment. For example, the electronic device may be a wearable electronic device that is internally filled with an electrorheological fluid or a magnetorheological fluid. The first processing of the environment information may be to change the state of the filled fluid to a solid state, thereby reducing a user's sensing of tactile events from the external environment. According to certain embodiments of the present disclosure, the switching method may include processing the second environment information in the first processing mode, which may reduce the user's sensing of the second environment information. For example, in a setting for study, the user may wish to be able to shield the surrounding environment information and concentrate on studying. The electronic device may perform the first processing on the second environment information, thereby reducing the user's sensing of the surrounding environment.

In the second processing mode, the second environment information is not processed, so that the user may perceive the second environment information when the electronic device outputs the media content information.

According to certain embodiments of the present disclosure, the second environment information may be audio information. For example, when the user listens to audio content outputted by the electronic device having an audio output component such as a headphone, the second environment information (audio information) may not be subjected to noise reduction or the like, so that the user may hear the surrounding environment sound.

According to certain embodiments of the present disclosure, the second environment information may be video information. For example, when the user views video content outputted by the electronic device having a transparent screen, the transmittance of the transparent screen may not be changed, so that the user may also view the surrounding environment information through the transparent screen.

According to certain embodiments of the present disclosure, the second environment information may also be olfactory information. In a scenario where a user wears a wearable electronic device (e.g., a mask), a gas passage between the wearable electronic device and the external environment may not be closed, so that the outside air may be transmitted into the head mounted electronic device. Alternatively, a filtering function between the wearable electronic device and the external environment may be turned off, so that the user may perceive olfactory information in the external environment.

According to certain embodiments of the present disclosure, the second environment information may be tactile information. For example, in a scenario where the electronic device is a wearable electronic device (e.g., a glove or a garment), the state of the electronic device may be changed such that an external tactile event (e.g., pressure or temperature) may be accurately delivered to the user via the electronic device. For example, the electronic device may be a wearable electronic device that is internally filled with an electrorheological fluid or a magnetorheological fluid that is restored to a liquid state, so that external tactile events can be transmitted to the user through the electronic device, enabling the user to perceive the external environment information. According to certain embodiments of the present disclosure, the switching method may not process the second environment information, so that the user may perceive the surrounding environment information. For example, in a scenario where a user uses an electronic device at home, the influence of the surrounding environment may not be excluded, and the second environment information may not be processed, so that the user may naturally perceive the environment information.

The third second processing mode may include performing second processing on the second environment information to acquire second environment content information related to the second environment information, so that the electronic device may simultaneously output the media content information and the second environment content information.

According to certain embodiments of the present disclosure, the second environment information may be audio information. For example, when the second environment is audio information, the second processing of the second environment information may be extracting specific audio information from the second environment information and outputting the specific audio information while outputting the media content information.

In certain embodiments, the switching method may include extracting specific voiceprint feature information or specific content information from the second environment information, and outputting the specific information along with the media content information to the user. For example, when the voiceprint information of a specific person (e.g., a family member, a friend, a colleague, etc.) is included in the second environment, the audio content corresponding to the voiceprint information may be extracted. Alternatively, when a particular audio content is included in the second environment, such as a siren, station reporting information, or a name, etc., the specific audio content may be extracted.

According to certain embodiments of the present disclosure, the second environment information may also be video information. For example, in a scenario where the electronic device has a transparent screen, the second processing of the second environment information may be to extract specific image information from the second environment information, and simultaneously outputting the specific image information with video content.

For example, the switching method may include extracting specific image information (for example, a specific person or the like) that meets a specific condition from the second environment information, and superimposing the specific image information with the media content output displayed by the electronic device.

According to certain embodiments of the present disclosure, the second environment information may be olfactory information. For example, in a scenario where the electronic device is a wearable electronic device (e.g, a mask), the second processing of the second environment information (olfactory information) may be to enhance the entry of outside air into the electronic device. For example, the amount of outside air entering the electronic device may be increased by a component such as a fan to enhance the user's sensing of the scent of the external environment. The second processing may also be to increase the specific scent in the outside air. For example, the specific scent in the air may be collected and recognized by an odor detecting device, and then corresponding simulated scent may be generated by an odor simulating device, thereby enhancing the user's olfactory sensing of the external environment.

According to certain embodiments of the present disclosure, the second environment information may also be tactile information. For example, in a scenario where the electronic device is a wearable electronic device (e.g., a glove or a garment), the second processing of the second environment information (tactile information) may be to collect tactile information by a collecting device (e.g., a device that collects a location, type, or intensity of a tactile event occurs). The electronic device may then simulate and enhance the tactile event and communicate it to the user to cause the user to perceive the enhanced tactile event. For example, the wearable electronic device may enhance the transmission of the tactile event using a pressure/temperature generator that generate a same type of tactile event as collected. For example, the wearable electronic device may have a pressure/temperature generating array that enhances the tactile event according to the location, type, and intensity of the external tactile event. The electronic device may then transmit the enhanced tactile event to the user, thereby enhancing the user's tactile sensing of the external environment.

According to certain embodiments of the present disclosure, the switching method may include performing second processing of the second environment information, acquiring second environment content information related to the second environment information, so that the electronic device may simultaneously output second environment content information while outputting media content information. The switching method may further include analyzing the second environment information, determining a corresponding output parameter according to the analysis result, and outputting the second environment content information according to the corresponding output parameter.

For example, when the second environment information is audio information, the switching method may include analyzing characteristics such as the orientation and/or distance of the audio information, and determining the audio output parameters according to the analysis result. For example, a binaural effect may be simulated, and if the audio information is transmitted from the right side of the user, the audio information may be turned up in the output volume in the right earphone and the output volume of the left earphone may be turned down. Alternatively, if the audio information indicates that an audio source is approaching the user, the output volume of the audio information may be gradually increased accordingly.

In another example, when the second environment information is video information, characteristics such as the orientation and/or distance of a specific object in the video information may be analyzed, and the video output parameter may be determined according to the analysis result. For example, when a specific object approaches the user from far to near, a display parameter of the specific object may be gradually enlarged accordingly, or a display definition of the specific object or the like may be gradually increased.

In another example, when the second environment information is olfactory information, characteristics such as direction and/or distance of occurrence of a specific scent in the olfactory information may be analyzed, and the odor output parameter may be determined according to the analysis result. For example, when a specific odor occurs on the right side of the user, the orientation information may be simulated, for example, by increasing a gas flow rate of a gas passage on the right side of the user, or by generating a simulated gas from the right side of the user by an odor simulation device.

In another example, when the second environment information is tactile information, characteristics such as the location at which the tactile information occurs may be analyzed, and the tactile information output parameter may be determined according to the analysis result. For example, when the tactile information is pressure information, the location at which the pressure occurs may be determined, and then the output parameter may be determined according to the location so that the user may perceive the tactile information at the location where the external tactile event occurs.

According to certain embodiments of the present disclosure, the switching method include analyzing the second environment information and determining a corresponding output parameter according to the analysis result, so that the user may more accurately sense the second environment information, thereby improving user experience.

According to certain embodiments of the present disclosure, the switching method may include a noise reduction processing of remaining environment audio information while extracting specific audio information in the second environment information. Alternatively, the switching method may include reducing the transparency of a display screen while extracting specific image information in the second environment information. Further, the switching method may include filtering remaining environmental olfactory information while extracting specific olfactory information from the second environment information. Alternatively, the switching method may include isolating remaining environmental tactile information while extracting specific tactile information from the second environment information. These processes may further enhance the user's sensing of specific environment information.

According to certain embodiments, the switching method may include performing second processing of the second environment information to enhance the user's sensing of the second environment information. For example, when a user is crossing a street, on one hand, the user may not want to be disturbed by surrounding environment information. On the other hand, the user may not want to miss important information (e.g., a siren, etc.). The electronic device may perform the second processing on the second environment information. The user may receive important environment information while receiving the media content played by the electronic device, thereby enhancing the user's sensing of the surrounding environment and avoiding unnecessary accidents.

The above three processing modes may enable the user's sensing of environment information to be enhanced. In certain embodiments of the present disclosure, after the electronic device is switched from the first processing mode to the second processing mode, the user may enhance the sensing of the second environment information and/or the second environment content information related to the second environment information. For example, the electronic device may be switched from the first processing mode to the second processing mode, or from the second processing mode to the third processing mode, or from the first processing mode to the third processing mode.

In certain embodiments of the present disclosure, the electronic device may switch between any two of the above processing modes. For example, when the first environment information meets a preconfigured condition, the electronic device may be switched to a mode that enables the user to enhance the sensing of the environment information. Further, when the first environment information does not meet the preconfigured condition within a preconfigured period of time, the electronic device may be switched back to a mode that does not enhance the sensing of the environment information for the user. For example, after switching, the electronic device may continue to monitor the environment. If the electronic device does not detect content that satisfying the preconfigured condition within the preconfigured period of time (e.g., 10 seconds or 1 minute), the electronic device may be switched back to a mode that does not enhance the sensing of the environment information for the user. In the meanwhile, the electronic device may continue to monitor the environment and detect whether there is content in the environment information that meets the preconfigured condition for subsequent switching. Alternatively, the electronic device may start monitoring after a preconfigured period of time after the switching (for example, after 1 minute after the switching). If the electronic device does not detect content that meets the preconfigured condition, the electronic device may be switched back to a mode that does not enhance the sensing of the environment information for the use.

In certain embodiments of the present disclosure, the electronic device may also adaptively switch between the above three processing modes. For example, when the first environment information is relatively cluttered and does not meet the preconfigured condition, the electronic device may be switched to the first processing mode to reduce the user's sensing of the environment and create a relatively quiet environment background for the user. When the first environment information is relatively clean and does not meet the preconfigured condition, the electronic device may be switched to the second processing mode, so that the user may naturally perceive the surrounding environment without being overly disturbed, and without missing important information in the environment information. When the first environment information satisfies the preconfigured condition, the electronic device may be switched to the third processing mode, so that the user may receive important environment information while receiving the media content output from the electronic device, thereby enhancing the user's sensing of the surrounding environment and preventing the user from missing important information.

The switching method according to certain embodiments of the present disclosure may further include storing the first environment information. When needed, the first environment information and the second environment information may be outputted to the user together after they are processed, thereby preventing the user from missing the first environment information.

For example, the switching method may include performing the second processing of the first environment information to acquire first environment content information related to the first environment information, and outputting the first environment content information before outputting the second environment content information. That is, after performing a same second processing on the first environment information as on the second environment information, when the output is performed, the processed first environment content information is outputted first, and the second environment content information is outputted next.

Alternatively, the switching method may include performing the second processing on the combined environment information composed of the first environment information and the second environment information to obtain combined environment content information related to the combined environment information, so that when the electronic device outputs the media content information, the combined environment content information may be simultaneously outputted. That is, the first environment information and the second environment information are first combined, the combined environment information is then subjected to the second processing, and the processed combined environment content information is outputted.

The first environment information may be at a time point before the second environment information. The first environment information may be used to determine whether the first condition is met, and the first environment information may also be information required by the user. Therefore, according certain embodiments of the present disclosure, the method may further include outputting the first environment information to the user, so that the user can acquire comprehensive environment information.

According to certain embodiments of the present disclosure, combining the first environment information and the second environment information may be a simple mixed output, for example, directly outputting the stored first environment information and the acquired second environment after the electronic device switches the processing mode. It may also be an output after processing. For example, the first environment information may be rapidly outputted, and then part of the second environment information may be rapidly outputted until the acquired environment information is matched to the output content, and then the acquired environment content information may be outputted at a normal speed. For example, the first environment information may be collected between time points T1-T2, when the first environment information is determined to meet the preconfigured condition, then processing mode of the electronic device is switched. Next the second environment information is collected between time points T2-T3. In certain embodiments of the present disclosure, contents collected during T1-T3 may be rapidly outputted during T2-T3. After time point T3, the output may be collected in real time.

In certain embodiments of the present disclosure, the electronic device may also be controlled to perform mode switching by receiving a user switching instruction, so that the user may select an appropriate output mode according to actual conditions.

The electronic device according to certain embodiments of the present disclosure can provide various output modes, and different output modes can make the user's sensing of the surrounding environment information different, thereby adapting to various application scenarios and improving the user experience.

According to certain embodiments of the present disclosure, the switching method may include extracting content information required by the user from the environment information, and simultaneously outputting the content information and the media content information to the user, thereby enhancing the user's sensing of the environment, and preventing the user from missing important information.

According to certain embodiments of the present disclosure, the switching method may include automatically switching operation modes of the electronic device according to environment information, and switching the operation modes of the electronic device according to a switching instruction of the user, so that the output of the electronic device is more in line with the user's needs, thereby improving user experience.

Figure 3:
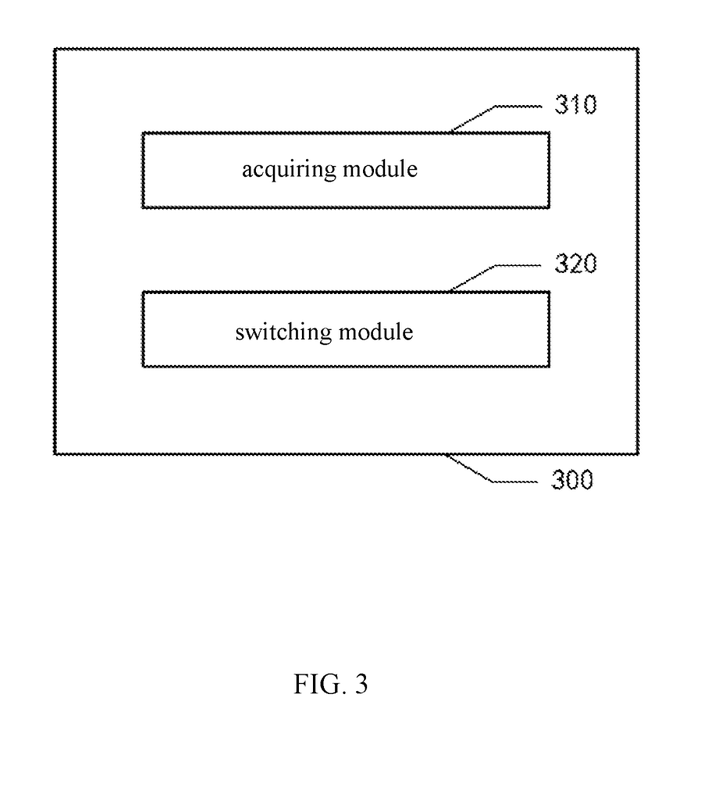
FIG. 3 is a block diagram of a switching device according to certain embodiments of the present disclosure.

FIG. 3 is a block diagram of a switching apparatus 300 according to certain embodiments of the present disclosure. As shown in FIG. 3, the switching apparatus 300 may include an acquisition module 310 and a switching module 320.

The acquiring module 310 may acquire the first environment information. The switching module 320 may switch the electronic device from the first mode to the second mode if the first environment information satisfies the first condition.

In the first mode, the electronic device may process second environment information in a first manner. In the second mode, the electronic device may process the second environment information in a second manner different from the first mode. Here, the first environment information is acquired at a first time point, the second environment information is acquired at a second time point, and the second time point is later in time than the first time point.

In certain embodiments of the present disclosure, the first mode and the second mode include at least two of the following processing modes: performing a first processing on the second environment information, so that the electronic device reduces the influence of the second environment information on the user's sensing of the media content information outputted by an electronic device; not processing the second environment information, so that the user may perceive the second environment information when the electronic device outputs the media content information; and performing second processing on the second environment information to acquire second environment content information related to the second environment information, so that the electronic device may simultaneously output the media content information and the second environment content information.

According to certain embodiments of the present disclosure, the switching apparatus may further include a storage module 330 (not shown) for storing the first environment information.

According to certain embodiments of the present disclosure, performing the second processing on the second environment information may further include at least one of: performing the second processing of the first environment information to acquire first environment content information related to the first environment information, and outputting the first environment content information before outputting the second environment content information; or performing the second process on the combined environment information composed of the first environment information and the second environment information to obtain combined environment content information related to the combined environment information, so that when the electronic device outputs the media content information, the combined environment content information may be simultaneously outputted.

In certain embodiments of the present disclosure, after the electronic device is switched from the first mode to the second mode, the user may enhance the sensing of the second environment information and/or the second environment content information related to the second environment information. The first environment information and the second environment information may be the same type of information, or the first environment information and the second environment information may be different types of information.

In certain embodiments, determining whether the first environment information satisfies a first condition may include determining whether the first environment information includes identity information of a person in the environment and whether the identity information matches preconfigured identity information. The process may include: identifying identity information of the person in the environment in the first environment information, where the identity information may include voiceprints and/or facial feature information, and determining whether the identity information matches preconfigured identity.

According to some embodiments of the present disclosure, the first condition may be whether the first environment information includes content information corresponding to the first environment information that matches preconfigured content.

Any of a plurality of modules, sub-modules, units, sub-units, or at least some of the functions of any one of the plurality of modules, sub-modules, or any of the plurality of functions according to certain embodiments of the present disclosure may be implemented in one module. Any one or more of the modules, sub-modules, units, sub-units according to certain embodiments of the present disclosure may be implemented by being split into a plurality of modules. Any one or more of the modules, sub-modules, units, sub-units according to embodiments of the present disclosure may be at least partially implemented as hardware circuits, such as a Field Programmable Gate Array (FPGA), a Programmable Logic Array (PLA), System-on-a-chip, system on a substrate, system on a package, an application-specific integrated circuit (ASIC), or any other reasonable means of hardware or firmware that integrates or encapsulates the circuit, or in software, hardware, and firmware. Any one of the implementations or in any suitable combination of any of them. Alternatively, one or more of the modules, sub-modules, units, sub-units according to embodiments of the present disclosure may be implemented at least in part as a computer programs stored in computer readable medium. When executed by one or more processors, the computer program can perform the corresponding functions of the module.

For example, any of the acquisition module 310 and the switching module 320 may be combined and implemented in one module, or any one of the modules may be split into multiple modules. Alternatively, at least some of the functionality of one or more of the modules may be combined with at least some of the functionality of the other modules and implemented in one module. According to certain embodiments of the present disclosure, at least one of the acquisition module 310 and the switching module 320 may be at least partially implemented as a hardware circuit, such as a field programmable gate array (FPGA), a programmable logic array (PLA), a system on a chip, a substrate. The system, the system on the package, the application specific integrated circuit (ASIC), or any other reasonable way to integrate or package the circuit, or hardware, firmware, or software, hardware, and firmware. Either or in any suitable combination of any of these. Alternatively, at least one of the acquisition module 310 and the switching module 320 can be implemented at least in part as a computer program module that can perform the corresponding functions when the computer program module is executed by one or more processors.

Figure 4:
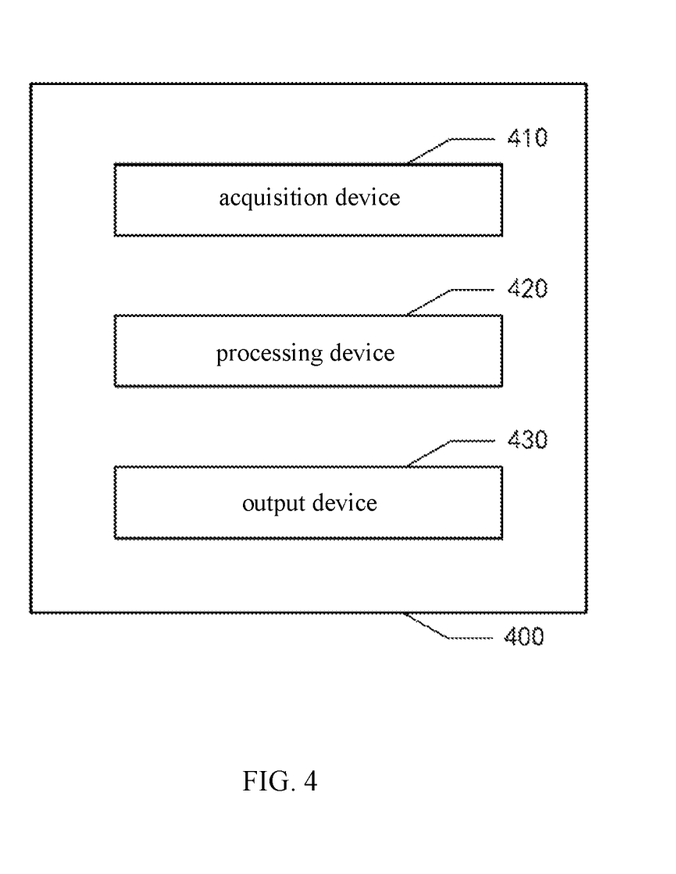
FIG. 4 is a block diagram of an electronic device according to certain embodiments of the present disclosure.

FIG. 4 is a block diagram of an electronic device 400 according to certain embodiments of the present disclosure.

As shown in FIG. 4, the electronic device 400 may include an acquisition device 410, a processing device 420, and an output device 430.

The acquisition device 410 may acquire first environment information. The processing device 420 may control the electronic device 400 to switch from a first mode to a second mode if the first environment information satisfies a first condition. The output device 430 may output in the second mode.

In the first mode, the processing device 420 may process second environment information in a first manner. In the second mode, the processing device 420 may process the second environment information in a second manner different from the first mode. Here, the first environment information is acquired at a first time point, the second environment information is acquired at a second time point, and the second time point is later in time than the first time point.

According to certain embodiments of the present disclosure, the collection device 410 may include at least one of an image acquisition device and an audio acquisition device. For example, the acquisition device 410 may be a camera and/or a microphone or the like.

According to certain embodiments of the present disclosure, the output device 430 may include at least one of a corresponding display device and an audio output device. For example, the output device 430 may be a display screen and/or a headphone or the like.

According to certain embodiments of the present disclosure, the processing device 420 may include a general-purpose microprocessor, an instruction set processor, and/or a related chipset and/or a special purpose microprocessor (e.g., an application specific integrated circuit (ASIC)), and the like. The processing device 420 may also include an onboard memory for caching purposes.

In certain embodiments of the present disclosure, the first mode and the second mode include at least two of the following processing modes: performing a first processing on the second environment information, so that the electronic device reduces the influence of the second environment information on the user's sensing of the media content information while outputting the media content information; not processing environment information, so that the user may perceive the second environment information when the electronic device outputs the media content information; and performing second processing on the second environment information to acquire second environment content information related to the second environment information, so that when the electronic device may simultaneously output the media content information and the second environment content information. For details, refer to the forgoing switching method referencing FIG. 2, and details are not described herein again.

In certain embodiments of the present disclosure, performing the first processing on the second environment information may include: at least partially removing environment audio information from the second environment information, thereby reducing the impact of environment audio information on the user's sensing of the audio content; and/or reducing the light transmittance of the display device of the electronic device, thereby reducing the impact of environment visual information on the user's sensing of the video content when the electronic device outputs the video content.

According to certain embodiments of the present disclosure, the second environment information may be audio information. The first processing of the second environment information may be to at least partially remove the ambient audio information in the second environment information (e.g., reducing noise in the audio information in the second environment information). For example, the electronic device may output a waveform negative to the audio information in the second environment information while outputting the media content information, the reverse sound wave equal to the is output, thereby offsetting the influence of the audio information in the second environment information on the user's sensing of the media content information.

According to certain embodiments, the electronic device may have a transparent screen. The first processing of the second environment information (video information) may be to reduce the transmittance of the screen of the electronic device, thereby reducing the influence of the second environment information to the user's sensing of video information played on the screen.

In certain embodiments of the present disclosure, performing the second processing on the second environment information may include: extracting specific audio information from the second environment information, so that when the electronic device outputs audio media content, the specific audio information is simultaneously outputted; and/or extracting specific image information from the second environment information, so that when the electronic device outputs video media content, the specific image information is simultaneously outputted.

For example, the electronic device may extract specific voiceprint feature information or specific content information in the second environment information, and output the specific information along with the media content information to the user. For example, when the voiceprint information of a specific person (e.g., a family member, a friend, a colleague, etc.) is included in the second environment, the audio content corresponding to the voiceprint information may be extracted. Alternatively, when a particular audio content is included in the second environment, such as a siren, station reporting information, or a name, etc., the specific audio content may be extracted.

In certain embodiments, the electronic device may extract specific image information (for example, a specific person or the like) that meets a specific condition from the second environment information, and superimpose the specific image information on the media content output displayed by the electronic device.

According to certain embodiments, the electronic device may be an earphone. The earphone may be provided with a microphone for collecting environment information. The earphone may be further integrated with a processor for switching the processing mode of the environment information of the earphone when the environment information satisfies a certain condition. Thus, the user may perceive different levels of environmental audio information.

According to certain embodiments, the electronic device may be a transparent display screen. The electronic device may be integrated with a camera and an image processor. The camera may collect environmental image information, and the processor may be configured to switch the processing mode of the electronic device so that a user may perceive different levels of ambient image information while viewing the display.

According to certain embodiments, the electronic device may be a wearable electronic device such as a mask. The wearable electronic device may have a gas passage connected to the external environment, and the gas passage may be provided with or without a filtering device. The wearable electronic device may further have a self-circulating gas passage. The wearable electronic device may further have an odor detector, a taste simulation device, and a processor.

In certain embodiments, an odor detector may capture a scent of the air in the environment, and the processor may be used to switch the manner in which the wearable electronic device processes the environment information when the ambient odor satisfies a certain condition. In a scenario where the electronic device is a wearable electronic device (e.g., a mask), the electronic device may close a gas passage between the wearable electronic device and the external environment, blocking outside air from the head-mounted electronic device. For example, the wearable electronic device may work through a filtered gas channel or a self-circulating gas channel to reduce the user's olfactory sensing of the external environment. Alternatively, a filtering function between the wearable electronic device and the external environment may be turned off, so that the user may perceive olfactory information in the external environment. The electronic device may also enhance the entry of outside air into the electronic device. For example, the amount of outside air entering the electronic device may be increased by a component such as a fan to enhance the user's sensing of the scent of the external environment. The second processing may also be to increase the specific scent in the outside air. For example, the specific scent in the air may be collected and recognized by a scent collecting device, and then the corresponding simulated scent may be generated by a scent simulating device, thereby enhancing the user's olfactory sensing of the external environment The electronic device of the embodiments of the present disclosure may also be a wearable electronic device such as a glove or a garment or the like. According to certain embodiments of the present disclosure, the wearable electronic device may be filled with an electrorheological fluid or a magnetorheological fluid, and the wearable electronic device may be integrated with a device such as a temperature/pressure detecting device, a temperature/pressure generator, and a processor.

In certain embodiments, a temperature/pressure sensing device may be used to detect a tactile event in the environment, and the processor may switch the manner in which the wearable electronic device handles the environmental tactile event when the tactile event satisfies a certain condition. For example, the state of matter within the electronic device may be changed to a solid state, thereby user's tactile sensing of the external environment. Alternatively, the electrorheological fluid or magnetorheological fluid may be restored to a liquid state, so that external tactile events can be transmitted to the user through the electronic device, enabling the user to perceive the external environment information. The wearable electronic device may also have a pressure/temperature generating array that enhance the tactile event according to the location, type, and intensity of the external tactile event. The electronic device may then transmit the enhanced tactile event to the user, thereby enhancing the user's tactile sensing of the external environment.

Figure 5:
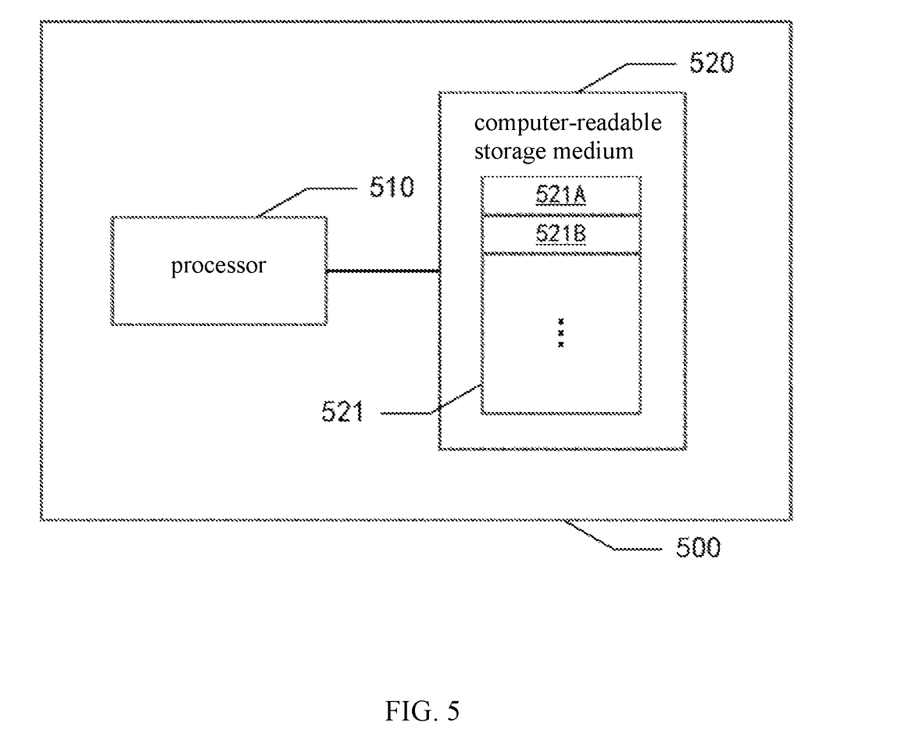
FIG. 5 is a block diagram of a computer system according to certain embodiments of the present disclosure.

FIG. 5 is a block diagram of a computer system according to certain embodiments of the present disclosure. The computer system shown in FIG. 5 may be used to implement the forgoing display method referencing FIG. 2. The computer system shown in FIG. 5 may also be placed in the electronic device shown in FIG. 4, wherein the same or similar processing device 510 is described with reference to FIG. 4 processor 420.

As shown in FIG. 5, the computer system 500 may include a processor 510 and a computer readable storage medium 520.

In certain embodiments, the processor 510 may include a general-purpose microprocessor, an instruction set processor, and/or a related chipset and/or a special purpose microprocessor (e.g., an application specific integrated circuit (ASIC)), and the like. Processor 510 may also include an onboard memory for caching purposes. Processor 510 may be a single processing unit or a plurality of processing units for performing different acts of a method flow according to certain embodiments of the present disclosure.

Computer readable storage medium 520, for example, can be any medium that can contain, store, communicate, propagate or transport the instructions. For example, a readable storage medium may include, but is not limited to, an electronic, magnetic, optical, electromagnetic, infrared, or semiconductor system, apparatus, device, or propagation medium. Specific examples of the readable storage medium include: a magnetic storage device such as a magnetic tape or a hard disk (HDD); an optical storage device such as a compact disk (CD-ROM); a memory such as a random access memory (RAM) or a flash memory; and/or a wired/Wireless communication link.

The computer-readable storage medium 520 may include a computer program 521, the computer program may include code 521/computer-executable instructions, which the processor 510 executes a method such that an embodiment of the present disclosure or any other variation when executed by the processor 510.

Computer program 521 can be configured to have computer program code, for example, including a computer program that can be stored in computer readable medium. For example, in an example embodiment, the code in computer program 521 may include one or more program modules, including, for example, module 521A, module 521B. It should be noted that the division manner and the number of modules is not fixed, and those skilled in the art may use suitable program modules or program module combinations according to actual situations. When these program module combinations are executed by the processor 510, the processor 510 may be A method according to certain embodiments of the present disclosure or any variation thereof is performed.

The present disclosure also provides a computer readable medium, which may be included in the apparatus/device/system described in the forgoing embodiments; or may be separately present without being incorporated into the apparatus/device/system. The computer readable medium may carry one or more programs, and when the one or more programs are executed, may implement: acquiring first environment information, and if the first environment information satisfies a first condition, switching the electronic device from the first mode to the second mode. In the first mode, the electronic device may process second environment information in a first manner. In the second mode, the electronic device may process the second environment information in a second manner different from the first manner. The first environment information is acquired at a first time point, the second environment information is acquired at a second time point, and the second time point is later in time than the first time point.

According to certain embodiments of the present disclosure, the computer readable medium may be a computer readable signal medium or a computer readable storage medium or any combination of the two. The computer readable storage medium can be, for example, but not limited to, an electronic, magnetic, optical, electromagnetic, infrared, or semiconductor system, apparatus, or device, or any combination of the above. More specific examples of computer readable storage media may include, but are not limited to, electrical connections having one or more wires, portable computer disks, hard disks, random access memory (RAM), read only memory (ROM), erasable Programmable read only memory (EPROM or flash memory), optical fiber, portable compact disk read only memory (CD-ROM), optical storage device, magnetic storage device, or any suitable combination of the foregoing. In the present disclosure, a computer readable storage medium may be any tangible medium that can contain or store a program, which can be used by or in connection with an instruction execution system, apparatus, or device. While in the present disclosure, a computer readable signal medium may include a data signal that is propagated in the baseband or as part of a carrier, carrying computer readable program code. Such propagated data signals can take a variety of forms including, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, including but not limited to wireless, wireline, optical cable, radio frequency signals, and the like, or any suitable combination of the foregoing.

The flowchart and block diagrams in the drawings illustrate the architecture, functionality, and operation of possible implementations of systems, methods, and computer program products according to various embodiments of the present disclosure. Each block of the flowchart or block diagrams may represent a module, a program segment, or a portion of code that includes one or more executable instructions. It should also be noted that, in some alternative implementations, the functions noted in the blocks may occur in different order. For example, two successively represented blocks may in fact be executed substantially in parallel, and they may sometimes be executed in the reverse order, depending upon the functionality involved. It is also noted that each block of the block diagrams or flowcharts, and combinations of blocks in the block diagrams or flowcharts, can be implemented by a dedicated hardware-based system that performs the specified function or operation, or can be implemented by a combination of dedicated hardware and computer instructions.

It will be appreciated by those skilled in the art that the variations and/or combinations of the various embodiments of the present disclosure and/or the claims may be made, even if such variations or combinations are not explicitly described in the present disclosure. In particular, various combinations of the features described in the various embodiments and/or claims of the present disclosure can be made without departing from the spirit and scope of the disclosure. All such combinations fall within the scope of the disclosure.

Although the present disclosure has been shown and described with respect to the specific exemplary embodiments, it will be understood by those skilled in the art that various changes in form and detail can be made to the present disclosure. Therefore, the scope of the present disclosure should not be limited to the forgoing described embodiments, but should be determined not only by the appended claims but also by the equivalents of the appended claims.

What is claimed is:

1. A switching method for an electronic device, comprising:
   acquiring first environment information at first time;
   acquiring second environment information at second time, the second time being later than the first time;
   determining whether the first environment information satisfies a first condition; and
   in response to the first environment information satisfying the first condition, switching the electronic device from a first operation mode to a second operation mode;
   wherein:
   in the first operation mode, the electronic device processes second environment information in a first processing manner; and
   in the second operation mode, the electronic device processes the second environment information in a second processing manner.

2. The switching method according to claim 1, wherein the first processing manner and the second processing manner comprise two of:
   performing first processing on the second environment information to reduce an impact of the second environment information on a user's perception of media content outputted by the electronic device;
   leaving the second environment information unprocessed to retain the user's perception of the second environment information while the user perceiving the media content outputted by the electronic device; and
   performing second processing on the second environment information to acquire second environment content related to the second environment information, and outputting the second environment content with the media content by the electronic device.

3. The switching method of claim 2, wherein:
   the switching method further comprises storing the first environment information; and
   performing the second processing on the second environment information includes at least one of:
      performing the second processing on the first environment information to acquire first environment content related to the first environment information, and outputting the first environment content before outputting the second environment content; and
      performing the second processing on combined environment information including the first environment information and the second environment information to acquire combined environment content related to the combined environment information, and outputting the combined environment content with the media content by the electronic device.

4. The switching method according to claim 1, wherein:
   after being switched from the first operation mode to the second operation mode, the electronic device enhances a user's perception of the second environment information.

5. The switching method according to claim 1, wherein the first environment information and the second environment information are a same type of information.

6. The switching method according to claim 1, wherein the first environment information and the second environment information are different types of information.

7. The switching method according to claim 1, wherein determining whether the first environment information satisfies the first condition includes:
   identifying identity information of a person in the first environment information; and
   determining whether the identity information of the person matches preconfigured identity information.

8. The switching method according to claim 1, wherein determining whether the first environment information satisfies the first condition includes:
   identifying content information corresponding to the first environment information; and
   determining whether the content information matches preconfigured content.

9. An electronic device, comprising:
   a collection device configured to acquire first environment information at first time and acquire second environment information at second time, the second time being later than the first time;
   a processing device, configured to:
      determine whether the first environment information satisfies a first condition; and
      in response to the first environment information satisfying the first condition, switch the electronic device from a first operation mode to a second operation mode; and
   an output device configured to output media content;
   wherein:
   in the first operation mode, the electronic device processes second environment information in a first processing manner; and
   in the second operation mode, the electronic device processes the second environment information in a second processing manner.

10. The electronic device according to claim 9, wherein the first processing manner and the second processing manner comprise two of:
    performing first processing on the second environment information to reduce an impact of the second environment information on a user's perception of a media content outputted by the electronic device;
    leaving the second environment information unprocessed to retain the user's perception of the second environment information while the user perceiving the media content outputted by the electronic device; and
    performing second processing on the second environment information to acquire second environment content related to the second environment information, and outputting the second environment content with the media content by the electronic device.

11. The electronic device according to claim 10, wherein:
    the electronic device further comprises a storage device configured to store the first environment information; and
    performing the second processing on the second environment information includes at least one of:
       performing the second processing on the first environment information to acquire first environment content related to the first environment information, and outputting the first environment content before outputting the second environment content; and
       performing the second processing on combined environment information including the first environment information and the second environment information to acquire combined environment content related to the combined environment information, and outputting the combined environment content with the media content by the electronic device.

12. The electronic device according to claim 9, wherein:
after being switched from the first operation mode to the second operation mode, the electronic device enhances a user's perception of the second environment information.

13. The electronic device according to claim 9, wherein determining whether the first environment information satisfies the first condition includes:
identifying identity information of a person in the first environment information; and
determining whether the identity information of the person matches preconfigured identity information.

14. The electronic device according to claim 9, wherein determining whether the first environment information satisfies the first condition includes:
identifying content information corresponding to the first environment information; and
determining whether the content information matches preconfigured content.

15. The electronic device according to claim 9, wherein:
the collection device comprises at least one of an image capturing device and an audio collecting device; and
the output device comprises at least one of a display device and an audio output device.

16. A computer system for switching an electronic device, comprising:
a computer-readable storage medium configured to store executable instructions; and
a processor, when executing the stored executable instructions, configured to:
acquire first environment information at first time;
acquire second environment information at second time, the second time being later than the first time;
determine whether the first environment information satisfies a first condition; and
in response to the first environment information satisfying the first condition, switch the electronic device from a first operation mode to a second operation mode;
wherein:
in the first operation mode, the electronic device processes second environment information in a first processing manner; and
in the second operation mode, the electronic device processes the second environment information in a second processing manner.

17. The computer system according to claim 16, wherein the first processing manner and the second processing manner comprise two of:
performing first processing on the second environment information to reduce an impact of the second environment information on a user's perception of a media content outputted by the electronic device;
leaving the second environment information unprocessed to retain the user's perception of the second environment information while the user perceiving the media content outputted by the electronic device; and
performing second processing on the second environment information to acquire second environment content related to the second environment information, and outputting the second environment content with the media content by the electronic device.

18. The computer system according to claim 17, wherein:
the memory is further configured to store the first environment information; and
performing the second processing on the second environment information includes one of:
performing the second processing on the first environment information to acquire first environment content related to the first environment information, and outputting the first environment content before outputting the second environment content; and
performing the second processing on combined environment information including the first environment information and the second environment information to acquire combined environment content related to the combined environment information, and outputting the combined environment content with the media content by the electronic device.

19. The computer system according to claim 16, wherein the first environment information and the second environment information are a same type of information.

20. The computer system according to claim 16, wherein the first environment information and the second environment information are different types of information.

\* \* \* \* \*